(12) United States Patent
Jensen

(10) Patent No.: US 6,783,676 B2
(45) Date of Patent: Aug. 31, 2004

(54) PRE- AND POST-TREATMENT SYSTEM AND METHOD FOR AQUATIC PLANT FILTRATION USING OZONE

(75) Inventor: Kyle R. Jensen, Apopka, FL (US)

(73) Assignee: AquaFiber Technologies Corporation, Winter Park, FL (US)

( * ) Notice: Subject to any disclaimer, the term of this patent is extended or adjusted under 35 U.S.C. 154(b) by 0 days.

(21) Appl. No.: 10/376,921

(22) Filed: Feb. 27, 2003

(65) Prior Publication Data

US 2003/0159987 A1 Aug. 28, 2003

Related U.S. Application Data

(60) Provisional application No. 60/361,632, filed on Feb. 28, 2002.

(51) Int. Cl.[7] .............................. C02F 3/32; C02F 1/78
(52) U.S. Cl. ...................... 210/602; 210/631; 210/170; 210/202; 210/259; 210/908
(58) Field of Search ................................ 210/602, 631, 210/748, 760, 170, 192, 202, 205, 259, 903, 906, 908

(56) References Cited

U.S. PATENT DOCUMENTS

| | | | |
|---|---|---|---|
| 3,794,582 A | | 2/1974 | Lackme et al.. |
| 4,141,830 A | | 2/1979 | Last |
| 4,333,263 A | | 6/1982 | Adey |
| 5,015,394 A | * | 5/1991 | McEllhenney et al. ..... 210/744 |
| 5,037,550 A | | 8/1991 | Montagnon et al. |
| 5,078,881 A | | 1/1992 | Augustine et al. |
| 5,131,820 A | | 7/1992 | Jensen |
| 5,194,147 A | * | 3/1993 | Augustine et al. .......... 210/151 |
| 5,364,537 A | | 11/1994 | Paillard |
| 5,389,257 A | | 2/1995 | Todd et al. |
| 5,527,456 A | | 6/1996 | Jensen |
| 5,573,669 A | | 11/1996 | Jensen |
| 5,591,341 A | | 1/1997 | Jensen |
| 5,846,423 A | | 12/1998 | Jensen |
| 5,851,398 A | | 12/1998 | Adey |
| 5,985,147 A | | 11/1999 | Jensen |

FOREIGN PATENT DOCUMENTS

| | | |
|---|---|---|
| JP | 2-83095 | 3/1990 |
| JP | 2-83097 | 3/1990 |
| JP | 3-270793 | 12/1991 |
| JP | 2000-117287 | 4/2000 |

OTHER PUBLICATIONS

*Ozone in Water Treatment Application and Engineering*, Cooperative Research Report, American Water Works Association and Compagnie Générale des Eaux, Lewis Publishers, 1991, pp. 31–79, 133–135, 154–157, 254, 273–298.

\* cited by examiner

*Primary Examiner*—Fred G. Prince
(74) *Attorney, Agent, or Firm*—Allen, Dyer, Doppelt, Milbrath & Gilchrist, P.A.

(57) ABSTRACT

A process for treating water to remove concentrations of nutrients and pollutants using ozone prior or after the water is exposed to natural filtration by periphyton or other aquatic plants. A system employs a deep water tank containing water to be treated is injected at the bottom with concentrated ozonated water to expose the water to be treated to ozone. The treated water exits from the tope of the tank whereby it is flowed over aquatic plant system to remove the undesired matter, such as pesticides. The process can be repeated successively to further treat the water if desired.

14 Claims, 1 Drawing Sheet

PRE- AND POST-TREATMENT SYSTEM AND METHOD FOR AQUATIC PLANT FILTRATION USING OZONE

CROSS-REFERENCE TO RELATED APPLICATION

This is application claims the benefit of U.S. Provisional Application No. 60/361,632, filed Feb. 28, 2002.

BACKGROUND OF THE INVENTION

The present invention relates to systems and methods for improving water quality, and, more particularly, to such systems and methods for bioremediating water with an attached algal colony, or other aquatic plants and, most particularly, to treating water against toxic compounds, microorganisms, and other water born pollutants in concert with an attached algal colony or other aquatic plants using ozone ($O_3$).

Algae comprise a group of aquatic plants with over 18,000 species and there are many times more aquatic plants growing rooted to the bottom and attached to other plants, floating and a mixture of both. As with terrestrial plants, the primary nutrients carbon, nitrogen and phosphorus, as well as a suite of micronutrients are essential for growth. Algae have developed the ability to exist where nutrients are in very short supply through many complex and unique biological pathways.

The removal of carbon, nitrogen and phosphorus and the micronutrients has become key to improving the quality of polluted water and restoring ecological balance. It is widely known that many aquatic plants absorb metals beyond immediate needs thus bio-concentrating them within plant cells as they remove them from water. Algae and other aquatic plants can take up primary and micronutrients that may be in overabundance, such as carbon, nitrogen, phosphorus, potassium, iron, aluminum, calcium and other substances and thus can be utilized to remediate an ecosystem. The preferred embodiment will from here on be referred to as attached algae, but any aquatic plant may be used for nutrient uptake so long as it extracts its nutrients from the water and can be harvested from the water to be improved.

Atmospheric remediation can occur when water flows over stationary algae or periphyton which, like all plants, require carbon. Periphyton has a higher productivity than any terrestrial plant. As modeled in the partial pressure of gas laws this creates significant consumption of carbon dioxide. Conservatively, 20 times more $CO_2$ (in the form of bicarbonate) is absorbed by periphyton as is absorbed by a mature forest land on an equal area. Significantly higher cell productivity of periphyton greatly affects $O_2$ production producing many times more $O_2$ per unit area.

Water remediation by regularly harvested periphyton has been shown to be 50 to 1000 times higher than constructed wetland systems per unit area. Remediation can occur when water flows over stationary algae taking up macro nutrients (carbon, nitrogen and phosphorus) and micro nutrients, while discharging oxygen as high as 3 times saturation. This high oxygen and hydroxyl environment has shown to reduce organic sediments by 0.25 meters per year. In long runs periphyton have been shown to increase pH due to carbon uptake to as high as 11. Filtration can occur through adsorption, absorption, physical trapping, and other more complex means.

A system used to effect this uptake is known as a "periphyton filter," the periphyton comprising a culture of a family of fresh, brackish, and or salt water plants known as "attached algae." Unlike such organisms as free-floating plankton, benthos or attached algae is a stationary community of epiphytes that will grow on a wide variety of surfaces. When occurring in the path of flowing water, the stationary algae and associated organisms remove nutrients and other compounds from the passing water, while absorbing carbon dioxide and releasing oxygen as a result of respiration, in turn a result of photosynthesis. Once an algal colony or community is established, roots or holdfasts cover the culture surface. If the plant bodies are harvested, leaving the roots behind, the nutrients and other pollutants contained in the plant bodies are removed from the water. Trapped in and around plant biomass nutrients can be exported continuously from a water stream, causing a natural filtration effect.

A further advantage to this technique is that the enriched algae can be harvested and used as a fish or animal feed, which serves to return the nutrients to the food chain.

Periphyton filters (PF) have the potential for use in a variety of applications. For example, the periphyton can be used to replace biological or bacterial filters in aquaria as pioneered by Stork and developed by Adey. As mentioned, natural periphyton can be used to remove nutrients and other contaminants from polluted waters. In addition, by harvesting the algal mass, various processes can be used to produce a biomass energy source such as methane or ethanol, fertilizer, a human or animal food additive or supplement, cosmetics, or pharmaceuticals.

The high productivity of the algae in a fibrous form has also yielded uses in the paper and paper products industry, as the harvested algae are many times stronger and easier to process than wood fiber. The limiting factor in many paper production lines is wet strength. Algal fibers can have exceptional wet strength, which can enhance paper production rates while removing nutrients from the paper plant waste stream thus enhancing the environmental preferability of a product. Most paper plants produce high nutrient waste streams which can be greatly enhanced by periphyton culture systems while producing cleaner water outflow and fiber which can be used to enhance the products manufactured by the plant. This capability has resulted in an economically, socially and environmentally sustainable method of managing human impact on aquatic ecosystems.

Triatomic oxygen or $O_3$ (ozone) is a naturally occurring gas created by the force of corona discharge during lightning storms or by UV light from the Sun. It is common knowledge that $O_3$ occurs in an upper atmospheric layer and is critical to the temperature balance on Earth.

$O_3$ in the lower atmosphere is viewed as a pollutant, however man-made $O_3$ systems are fitted with simple destruction technology that completely eliminates concerns about $O_3$ use by man. Such systems are widely used for drinking and wastewater treatment as well as air filtration with doses bearing healthy safety factors.

$O_3$ is 1.5 times as dense as oxygen and 12.5 times more soluble in water and with high doses leaves no residuals or byproducts except oxygen and a minimal amount of carbon dioxide, trace elements and water. It can be manufactured from dry air or from oxygen by passing these, gases through an electric field of high potential sufficient to generate a "corona" discharge between the electrodes. This corona discharge is not quite the energy of an automotive spark plug, but just under that level. Ultraviolet light and shorter wavelength radiation also causes oxygen to undergo conversion to $O_3$, which may be used for industrial wastewaters (Belew, 1969). $O_3$ is a more potent germicide than hypochlorite acid by factors of 10 to 100 fold and disinfects 3125 times faster than chlorine (Nobel, 1980).

$O_3$ is highly unstable and must be generated on site. The measure of an oxidizer and its ability to oxidize organic and inorganic material is its oxidation potential (measured in volts of electrical energy). $O_3$'s oxidation potential (−2.07V) is greater than that of hypochlorite acid (−1.49V) or chlorine (−1.36V), the latter agents being widely used in water treatment practice.

A residence time is required for the ozone gas in the water to be used up as it contacts particles to oxidize them. Typically this is done with large mixing chambers and mixing pumps. Many times the site of a periphyton filter is some distance from the water to be treated. With mixing occurring just downstream of the supply pump or pie entrance at single or multiple static mixers, integration can be included in the pipe and then the residence time in the pipe allows for treatment as the water travels to the periphyton filter. This extended contact time can provide increased treatment. Multiple static mixers and ozone injection points may be employed for optimum efficiency. Economical covered ponds can also b used for increased contact time.

Pumping water down a feed tube within a larger fully cased well with a closed bottom and then injecting ozone at the bottom of the well, where the pressure is at maximum, may also enable better dispersion in the water column. As the water rises up the well necessary contact time is provided between the ozone and particles in the water.

As set forth in the present invention combining ozone and periphyton filtration provides many advantages over use of either technological approach separately. Ozone breaks down bound nutrients in the water preparing them for fast uptake by periphyton. Treatability studies on the phenomenon have been executed on several central Florida lakes. Lake Apopka, for example, has a very high standing crop of phytoplankton. Lake Apopka water shows 2 PPB SRP and 352 PPB TP and after a 1 mg/l dose and 1 minute contact time SRP was raised to 147 PPB. The rise is largely due to the oxidation of plankton cell walls and spilling cytoplasm into the water which contains PPB.

Toxic cyanobacteria pose a particularly challenging set of filtration challenges in that the toxins may exist both inside and outside of the algal cell. While ozone can be used to detoxify such substances in both cases, the periphyton filter also has a detoxifying capability. As the teachings of Jensen described in U.S. Pat. Nos. 5,527,456; 5,573,669 and 5,591, 341, water passing across attached algal cultures experience an increase in pH due to the removal of significant quantities of carbon by the algae. Algae remove carbon, nitrogen and phosphorus as a macronutrients and many other elements and compounds as micronutrients. The removal of carbon, a mild acid, causes a rise in the number of (OH+) hydroxyl ions and this is typically measured logarithmically as a rise in pH. This environment is aggressive to other compounds such as the algal toxins released by cyanobacteria. So a synergistic combination of ozone pre- and post-treatment, to destroy toxins and make available bound nutrients for periphyton along with periphyton to produce a hostile environment via production of hydroxyl ions work together to both detoxify and denutrify source waters.

Re-circulation loops within combined systems can enhance water treatment because the oxonation process is enhanced in waters with increased pH. In this embodiment a water which has experienced increase in pH via a periphyton filter or other plant filtration system can then be exposed to oxonation with enhanced effectiveness due to said pH increase mediated by aquatic plants.

Carbon which has been activated has numerous sites to bind toxins and other substances. Even further ultraviolet light can be used to reduce all ozone in effluent to preclude oxidation of aquatic plants. After water has been treated by ozone and periphyton filtration, activated carbon can be used to polish the water.

Ozone used prior to, between and after filtration using periphyton and other aquatic plants has several synergistic effects.

1. Ozone breaks up planktonic algae in lake waters making the nutrients available for growth of periphyton and removal from water.
2. After the nutrients are available and removed by the periphyton the water can be returned to the water body in such a state that toxic algae cannot re-grow, thus effecting an enhanced remediative effect.
3. Ozone destroys certain forms of toxic compounds found in cyanobacteria (blue green algae), recently found to be dangerous to humans and animals. These toxic compounds as well as the non-toxic compounds are then available for incorporation into filamentous algae grown for industrial use in the paper products industry.
4. Ozone destroys both micro-invertebrates and there eggs which often settle, hatch and grow as they consume desirable periphyton, thus reducing the effects of filtration.
5. Use of innovative static mixing technology can be implemented such as that used by Westfall and KOMAX corporations.
6. Use of covered ponds and supply pipes for increased ozone contact time.
7. Use of chased wells for ozone injection provides enhanced ozone treatment due to high pressure at the well bottom.
8. Periphyton filtration and ozone in sequence or with recirculation can provide enhanced treatment by enhanced pH/ozone performance.
9. Activated carbon filtration for post treatment polishing of ozone periphyton treated water.

These treatment steps described herein can be used prior to aquifer recharge and storage.

Studies in algal turf and periphyton filtration are known in the art. Algal turf techniques have been disclosed in Adey's U.S. Pat. No. 4,333,263, and the present inventor's U.S. Pat. Nos. 5,131,820, 5,527,456, 5,573,669, 5,591,341, 5,846, 423, and 5,985,147, the disclosures of which are incorporated herein by reference. However, none of the latter patents disclose systems and methods of the present invention.

SUMMARY OF THE INVENTION

The primary object of the present invention is to provide a system and method for pre-treating and/or post-treating water in concert with a periphyton culture surface.

Another object of the present invention is to provide a method which releases nutrients bound by biological or chemical or a combination of these means so they may be rebound in periphyton or other aquatic plants or organisms.

A further object of the present invention is to provide a method which releases nutrients bound by biological or chemical or a combination of these means so they may be rebound on a natural or manmade substrate such as limerock.

An even further object of the present invention is to provide such a system and method for reducing a population of undesirable microinvertabrates in a periphyton filtration bed.

An additional object of the present invention is to provide such a system and method for detoxifying and thus reducing or eliminating toxins from inflow water as well as a toxicity level of harvested algal mass.

These objects and others are attained with the system and method of the present invention. The system comprises means for adding a strong oxidizer to the influent and in some cases the effluent. A particular embodiment comprises ozonating the water.

The method of treating the water comprises the steps of exposing water desired to be treated with ozone in sufficient quantity to reduce a concentration of microorganisms therein and flowing the water over a colony of attached algae to remove undesired matter there from, such as, but not intended to be limited to, nutrients.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained and advantages offered, by the present invention will become more fully apparent as the description that now follows is read in conjunction with the accompanying drawing.

BRIEF DESCRIPTION OF THE DRAWINGS

In the following detailed description, reference will be made to the attached drawings in which.

DESCRIPTION OF THE PREFERRED EMBODIMENTS

Figure 1:
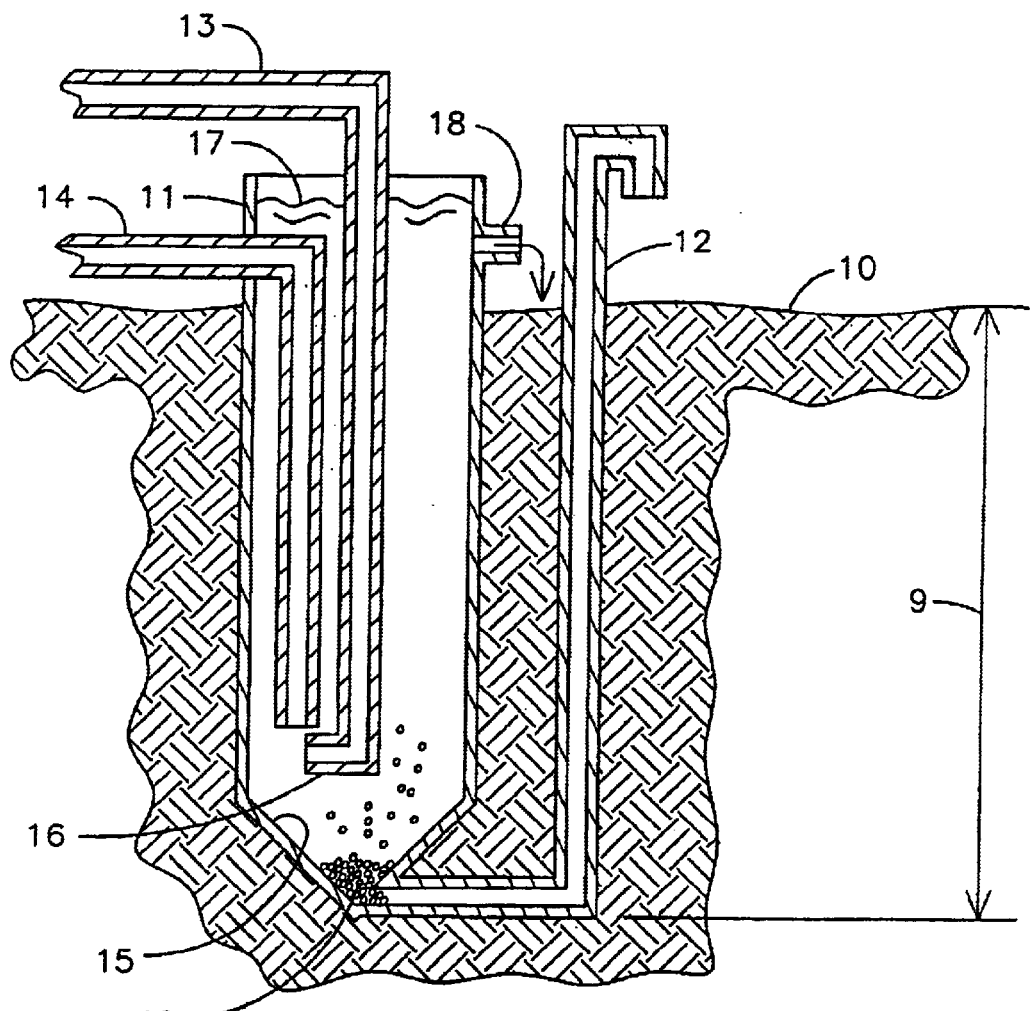
FIG. 1 is a side cutaway view of an ozone contact chamber which may be employed to treat large flows.

For purposes of describing the preferred embodiment, the terminology used in reference to the numbered components in the drawings is as follows:

| | |
|---|---|
| 9. | depth |
| 10. | soil |
| 11. | treatment tank |
| 12. | sediment line |
| 13. | side stream pipe |
| 14. | main flow pipe |
| 15. | tank bottom |
| 16. | side stream pipe discharge |
| 17. | water surface |
| 18. | discharge nozzle |
| 19. | sediment |
| 20. | water body |
| 21. | ozone treatment system |
| 22. | periphyton filter |

-continued

| | |
|---|---|
| 23. | second ozone treatment system |
| 24. | second periphyton filter |

Referring to FIG. 1, an economical and efficient ozone contact chamber particularly suited to large-scale applications is illustrated. A tall cone treatment tank 11 of depth 9 is installed in sandy soil 10 by either full excavation or by mixing polymer in the sand in situ and than pumping out said sand while the tank settles in place and is filled with water for ballast. This method is typically used for large power pole concrete footings by Florida Power Corporation. A main flow pipe 14 carries water to be treated to the vessel bottom 15. A side stream pipe 13 carries ozone-laden water to pipe discharge 16 where the ozone-laden water mixes with mainstream water. Water progresses up the tank vertically at a slow rate allowing for necessary contact time for desired level of oxidation by ozone to the surface 17 whereat it is discharged out the nozzle 18 for nutrient removal downstream. Any precipitates falling to bottom of tank 11 are evacuated by sediment line 12.

Figure 2:
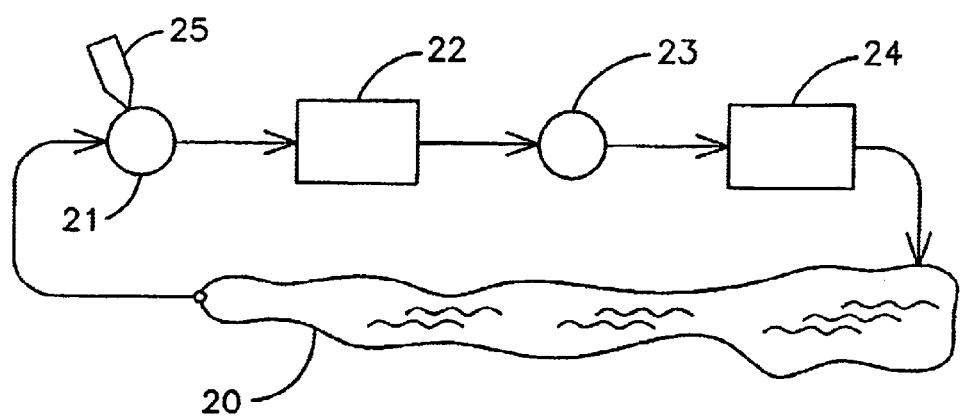
FIG. 2 is a schematic diagram of a water treatment train combining ozone and periphyton filtration in the present invention.

FIG. 2 illustrates the method of the present invention. A lake or other water body 20 from which water is drawn is from and supplied to an ozone treatment system 21 as depicted in FIG. 1. Chemical flocculation or ultraviolet treatment systems 25 may be used to pre-treat water to be ozone exposed to enhance ozone treatment. Ozonated water is then fed to a plant uptake system such as a periphyton filter 22. If necessary to further treat the water, the process can be repeated in a second ozone system 23 and a second periphyton filter 24 and then water before returning to the lake or water body 20.

Although only a few embodiments of the present invention have been described in detail hereinabove, all improvements and modifications to this invention within the scope or equivalents of the claims are included as part of this invention.

Having thus described my invention, I claim:

1. A method of treating water comprising the steps of:
   (a) exposing influent comprising water desired to be treated to ozone in sufficient quantity to disrupt cell walls of undesired microorganisms therein, thereby releasing nutrients from within the microorganisms in a form amenable to bioassimilation, the ozone further in sufficient quantity to oxidize toxic, humic, and tannic compounds to a form amenable to bioassimilation; and
   (b) contacting aquatic plants with the ozone-exposed water, the aquatic plants adapted to remove the released and oxidized nutrients therefrom.

2. The method recited in claim 1, wherein the aquatic plants comprise a colony of attached algae, and further comprising the steps of:
   (c) exposing water exiting the algal colony to additional ozone treatment; and
   (d) flowing the additionally ozone-exposed water over a second colony of attached algae.

3. The method recited in claim 1, wherein step (a) comprises the steps of injecting ozonated water into a bottom of a vessel, injecting the water to be treated into the vessel bottom, thereby creating the ozone-exposed water, permitting the ozone-exposed water to rise to a top of the vessel, and transporting the ozone-exposed water from the vessel top to the aquatic plants.

4. The method recited in claim 1, further comprising the step, prior to step (a), of pretreating the influent with a chemical flocculant to precipitate out some of the excess nutrients.

5. The method recited in claim 4, wherein step (a) and the pretreating step are carried out in a unitary vessel, and further comprising the step, following the pretreating step, of removing precipitate from a bottom of the vessel.

6. The method recited in claim 1, further comprising the step, prior to the water-exposing step, of generating ozone by at least one of exposing air to ultraviolet radiation and creating a corona discharge.

7. The method recited in claim 1, wherein the water-exposing step comprises pumping the water into a bottom end of a tube, injecting ozone adjacent the bottom end of the tube, and permitting the water and the ozone to mix while rising toward a top end of the tube.

8. The method recited in claim 1, further comprising the step of post-treating the water with ozone following the contacting step.

9. The method recited in claim 1, further comprising the step of passing the water through an activated carbon filter following the contacting step.

10. A system for treating water containing excess nutrients comprising:

means for exposing influent comprising water desired to be treated to ozone in sufficient quantity to disrupt cell walls of undesired microorganisms therein, thereby releasing nutrients from within the microorganisms in a form amenable to bioassimilation, the ozone further in sufficient quantity to oxidize toxic, humic, and tannic compounds to a form amenable to bioassimilation;

aquatic plants adapted to remove the released nutrients and the oxidized compounds from the ozone-exposed water; and means for directing the ozone-exposed water from the water-exposing means to the aquatic plants.

11. The system recited in claim 10, wherein the exposing means comprises:

a vessel;

an influent line for transporting the influent adjacent a bottom of the vessel;

an ozone line for injecting ozonated water adjacent the vessel bottom, for permitting the influent and the ozonated water to mix while flowing upward in the vessel, thereby forming ozone-exposed water, and wherein:

the means for directing the ozone-exposed water comprises means for transporting water from adjacent a top of the vessel to the aquatic plants.

12. The system recited in claim 10, further comprising means for pretreating the influent with a chemical flocculant to precipitate out some of the excess nutrients prior to exposing the influent to ozone.

13. The system recited in claim 12, wherein the exposing means comprises a vessel, and the pretreating means is positioned in the vessel, and further comprising means for removing precipitate from a bottom of the vessel.

14. The system recited in claim 10, further comprising an activated carbon filter and means passing the water through the filter downstream of the aquatic plants.

* * * * *